United States Patent
Luthra et al.

(10) Patent No.: US 11,947,942 B2
(45) Date of Patent: Apr. 2, 2024

(54) APPLICATION ARTIFACT REGISTRATION

(71) Applicant: Rakuten Mobile, Inc., Tokyo (JP)

(72) Inventors: Mohit Luthra, Singapore (SG); Abhishek Sharma, Tokyo (JP); Bharath Rathinam, Tokyo (JP); Rajasi Ahuja, Tokyo (JP); Jithin Chathankandath, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 147 days.

(21) Appl. No.: 17/645,947

(22) Filed: Dec. 23, 2021

(65) Prior Publication Data

US 2023/0205502 A1     Jun. 29, 2023

(51) Int. Cl.
| | |
|---|---|
| *G06F 8/30* | (2018.01) |
| *G06F 8/60* | (2018.01) |
| *G06F 8/71* | (2018.01) |
| *G06F 9/445* | (2018.01) |
| *G06F 9/455* | (2018.01) |
| *H04L 67/10* | (2022.01) |

(52) U.S. Cl.
CPC ............... *G06F 8/60* (2013.01); *H04L 67/10* (2013.01)

(58) Field of Classification Search
CPC ........ G06F 21/566; G06F 21/577; G06F 8/61; G06F 11/3636; G06F 11/36; G06F 8/60; G06F 9/45558; G06F 9/5072; G06F 21/00; H04L 67/10
See application file for complete search history.

(56) References Cited

U.S. PATENT DOCUMENTS

| | | | | |
|---|---|---|---|---|
| 10,621,314 | B2 * | 4/2020 | Fox | .......................... G06F 8/60 |
| 11,226,813 | B2 * | 1/2022 | Gungabeesoon | ......... G06F 8/60 |
| 2021/0146543 | A1 | 5/2021 | Cristache | |
| 2021/0226929 | A1 | 7/2021 | Kiyanclar et al. | |

OTHER PUBLICATIONS

Hilt et al., Future edge clouds, 17 pages (Year: 2019).*

* cited by examiner

*Primary Examiner* — Thuy Dao
(74) *Attorney, Agent, or Firm* — HAUPTMAN HAM, LLP

(57) ABSTRACT

Application artifact registration is performed by receiving a bundle service specification configured for deployment of a software service in a cloud native environment, transferring a bundle from an original address indicated in the bundle service specification to an object storage at a principal address, attaching, to the bundle service specification, a bundle identifier and the principal address, extracting a plurality of artifacts from the bundle, each of the plurality of artifacts being stored in the object storage at a subordinate address, and creating one or more artifact service specifications, each artifact service specification representing one or more of the plurality of artifacts, each service specification representing the corresponding subordinate address, an artifact identifier, and an artifact type of each represented artifact.

20 Claims, 6 Drawing Sheets

APPLICATION ARTIFACT REGISTRATION

BACKGROUND

During the life cycle of an application provided as a service, multiple modules are individually utilized to deploy the application, maintain the application, update the application, provided user access to the application, manage licenses of the application, terminate the application, etc. Because not all applications are universally compatible, each module utilizes a related application to perform the respective task. An orchestrator is usable to manage the modules by providing information about the application and related applications.

Applications are able to be deployed from a bundle that includes both the application, the related applications for use by the modules, and any other information used for deployment.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
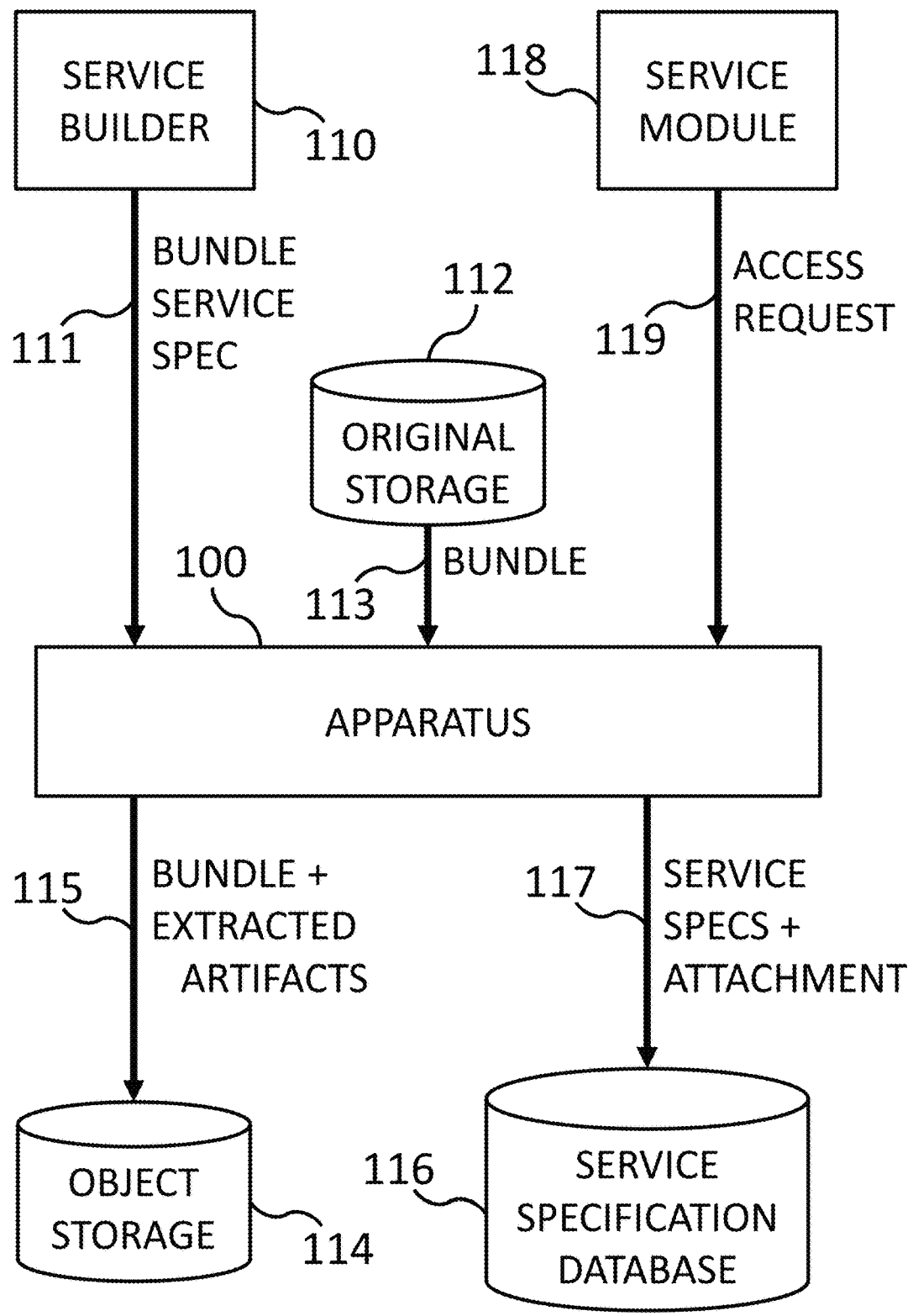
FIG. 1 is a schematic diagram of a system for application artifact registration, according to at least some embodiments of the present invention.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

When an application bundle originates from outside the orchestrator environment, the modules access the bundle through the orchestrator. Although an individual module may only utilize one related application, the original storage for the bundle may only provide the bundle itself without enabling selection of individual related applications. To compensate, the whole bundle is retrieved and extracted.

In at least some embodiments herein, an application originating outside of the orchestrator environment is retrieved, extracted, and stored in an object storage within the orchestrating environment. In at least some embodiments, the orchestrator registers bundles, templates, descriptors, etc., to support application deployment and other life cycle management tasks. In at least some embodiments, the orchestrator provides access to the bundle and applications within through an Application Programming Interface (API). In at least some embodiments, the applications are provided in response to selection from a service catalog.

In at least some embodiments, applications originating outside of the orchestrator environment are accessible through the singular orchestrator so that one common module, such as a service order management module, accesses all applications in the same format as and when required when orchestrating a service. In at least some embodiments, all modules within the orchestrator have access to the bundle as well as any applications or artifacts within the bundle, so that the modules within the orchestrator do not require access to the original location of the bundle.

FIG. 1 is a schematic diagram of a system for application artifact registration, according to at least one embodiment of the present invention. The diagram includes an apparatus 100, a service builder 110, an original address 112, an object storage 114, a service specification database 116, and a service module 118.

Service builder 110 is configured to transmit a bundle service specification 111 to apparatus 100. In at least some embodiments, bundle service specification 111 includes an original address to an original storage 112 of a bundle 113. In at least some embodiments, the original address is a link or Uniform Resource Locator (URL) using the HyperText Transfer Protocol (HTTP) to bundle 113 stored on original storage 112. In at least some embodiments, bundle 113 includes one or more applications to be provided as a service. In at least some embodiments, bundle 113 includes a Radio Access Network (RAN) application and one or more related applications configured to facilitate deployment, maintenance, monitoring, configuration access, monitoring, termination, etc., of the application. In at least some embodiments, service builder 110 is configured to transmit the bundle service specification along with a request for registration of bundle 113 in a software service catalog. In at least some embodiments, service builder 110 is configured to submit the request for registration through an API of apparatus 100.

Apparatus 100 is configured to perform application artifact registration. Apparatus 100 is configured to receive bundle service specification 111 from service builder 110. In least some embodiments, apparatus 100 is configured to retrieve bundle 113 from original storage 112 in response to receiving a request for registration of bundle 113 is a software service catalog. In at least some embodiments, apparatus 100 is configured to transfer bundle 113 from original storage 112 to object storage 114. In at least some embodiments, object storage 114 is within the same secure area as apparatus 100, which is likely to provide apparatus 100 quicker and more efficient access to object storage 114 than original storage 112. In at least some embodiments, apparatus 100 is configured to extract a plurality of artifacts from bundle 112, and to store those artifacts in object storage 114. In at least some embodiments, apparatus 100 is configured to create service specifications and attachments thereof for bundle 112 and the extracted artifacts. In at least some embodiments, apparatus 100 is configured to store service specifications 117, which includes service specifications created by apparatus 100 and service specifications including attachments created by apparatus 100, in service specification database 116.

Apparatus 100 is configured to receive an access request 119 from service module 118. In at least some embodiments, service module 118 is one of a service order module, an Onboarding Funnel (OBF) module, a maintenance module, an updating module, a configuration access module, a monitoring module, a license management module, a termination module, or any other module configured to access applications orchestrated by apparatus 100. In at least some embodiments, service module 118 is a program that is executed by apparatus 100. In at least some embodiments, service module 118 is configured to transmit access request 119 through the API of apparatus 100. In at least some embodiments, access request 119 includes an identifier of an application. In at least some embodiments, apparatus 100 is configured to provide service module 118, in response to receiving access request 119, a service specification of the identified application.

Figure 2:
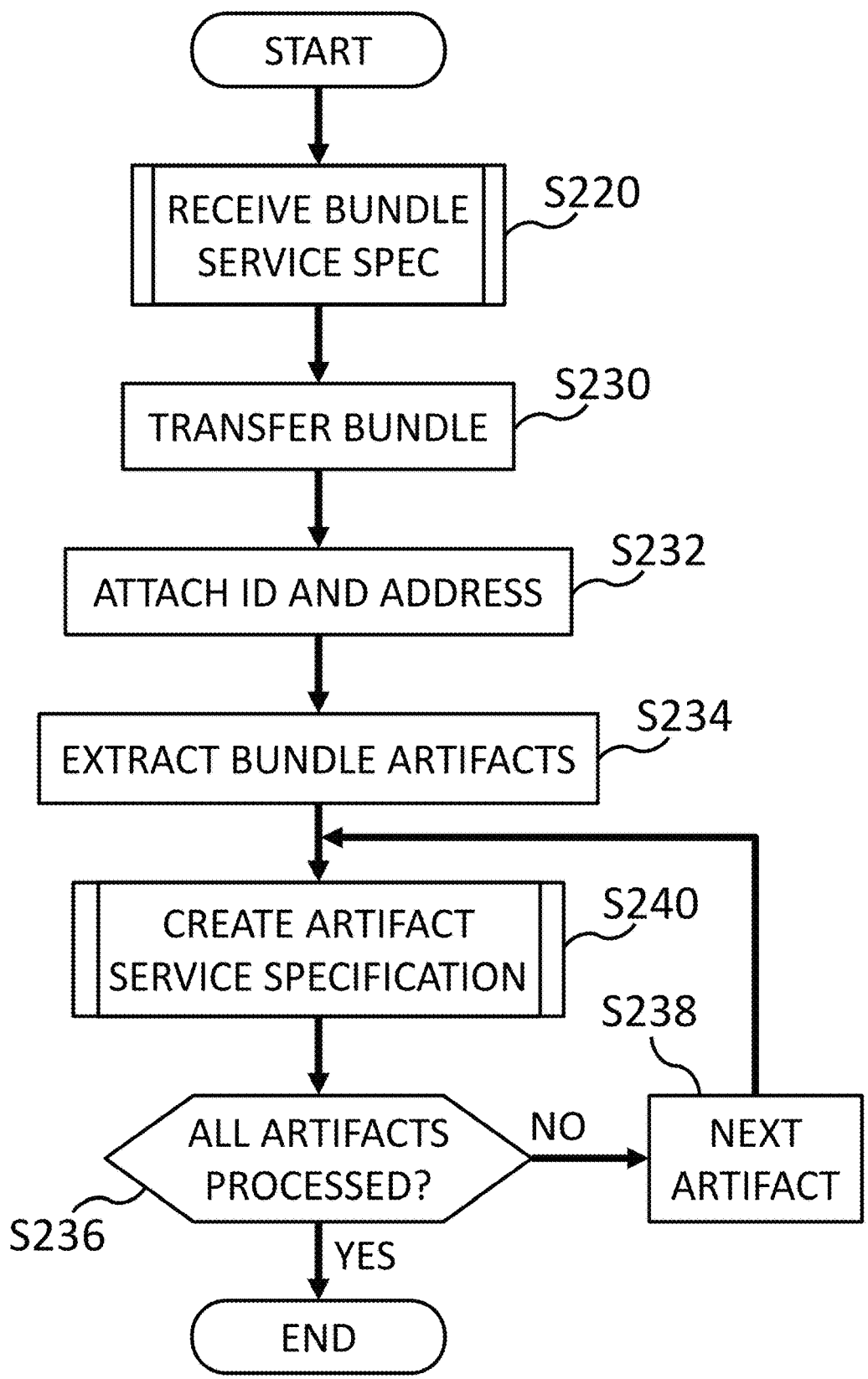
FIG. 2 is an operational flow for application artifact registration, according to at least some embodiments of the present invention.

FIG. 2 is an operational flow for application artifact registration, according to at least one embodiment of the present invention. The operational flow provides a method of application artifact registration. In at least some embodiments, the method is performed by a controller of an apparatus including sections for performing certain operations, such as the controller and apparatus shown in FIG. 6, which will be explained hereinafter.

Figure 5:
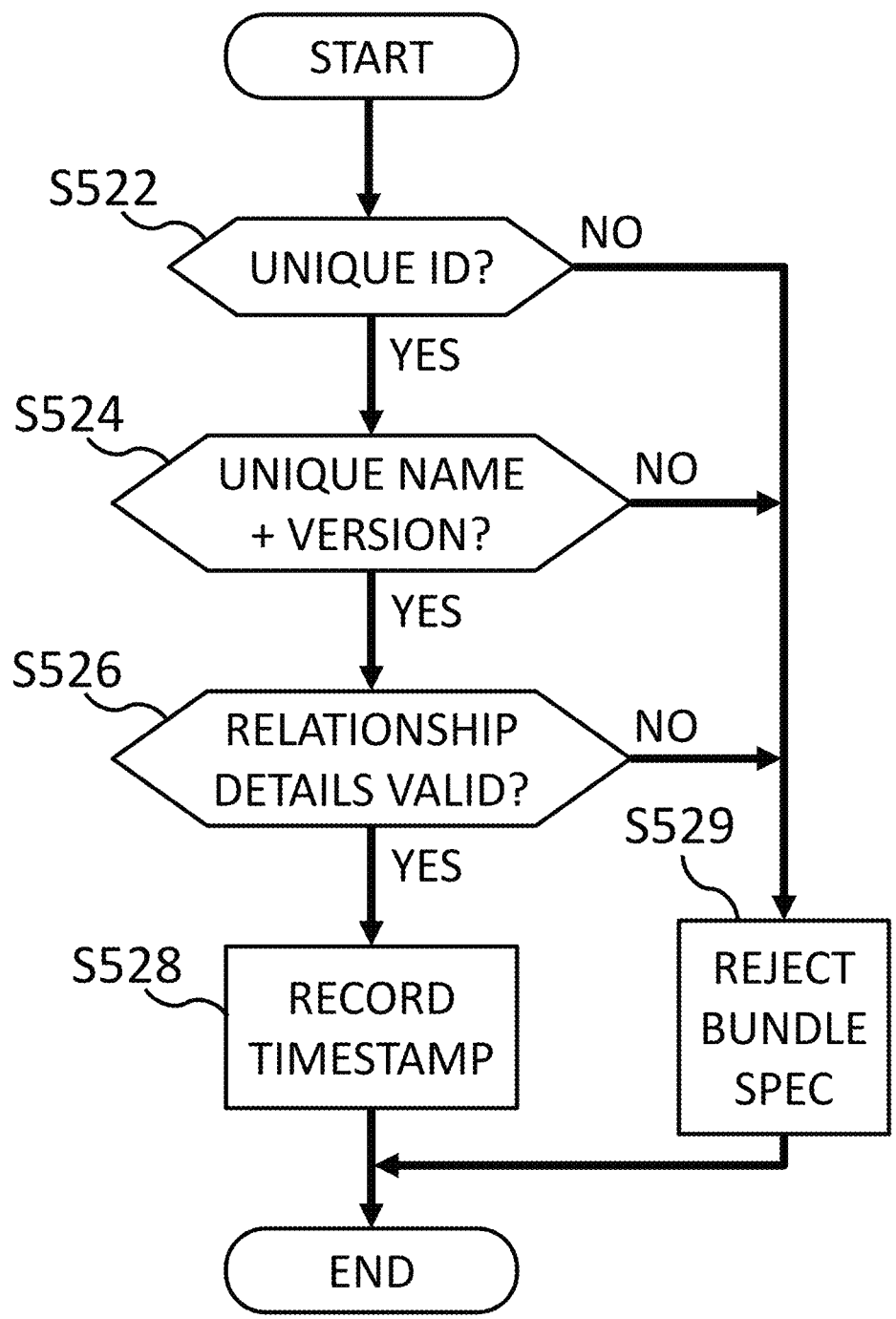
FIG. 5 is a further operational flow for receiving a bundle service specification, according to at least some embodiments of the present invention.

At S220, a registering section or a sub-section thereof receives a bundle service specification. In at least some embodiments, the registering section receives a bundle service specification configured for deployment of a software service in a cloud native environment. In at least some embodiments, the receiving the bundle includes receiving a request for registration of the bundle in a software service catalog. In at least some embodiments, the registering section receives the bundle service specification through an API, such as the TM Forum (TMF) 633 API standard. In at least some embodiments, the bundle service specification includes fields of "id", "name", "href", "version", "description", "lifecycleStatus", "type", "baseType", etc. In at least some embodiments, the bundle service specification includes an attachment with fields of "id", "name", "url", "description", "attachmentType", etc. In at least some embodiments, the bundle service specification reception proceeds as shown in FIG. 5, which will be explained hereinafter.

At S230, the registering section or a sub-section thereof, transfers a bundle corresponding to the bundle service specification received at S220 to an object storage. In at least some embodiments, the registering section transfers the bundle from an original address indicated in the bundle service specification to an object storage at a principal address. In at least some embodiments, the bundle service specification indicates the original address of the bundle in an original storage. In at least some embodiments, the bundle service specification includes an attachment indicating the original address. In at least some embodiments, the registering section retrieves the bundle from the original storage, and then transmits the bundle to object storage. In at least some embodiments, the registering section downloads the bundle from an artifactory URL provided in the bundle service specification. In at least some embodiments, the registering section uploads the bundle to a new bucket in the object storage.

At S232, a creating section or a sub-section thereof attaches, to the bundle service specification, an identifier and an address of the bundle in the object storage. In at least some embodiments, the creating section attaches, to the bundle service specification, a bundle identifier and the principal address. In at least some embodiments, the creating section creates an attachment similar to an attachment to the bundle service specification received with the bundle service specification, except for replacing the address of the bundle in the original storage with the address of the bundle in the object storage.

At S234, the registering section or a sub-section thereof extracts one or more artifacts from the bundle. In at least some embodiments, the registering section extracts a plurality of artifacts from the bundle, each of the plurality of artifacts being stored in the object storage at a subordinate address. In at least some embodiments, the registering section stores the extracted artifacts in a subordinate address structured as "{catalog endpoint}/{bucket name}/{directory of artifact}", where "{catalog endpoint}" refers to the general address of the object storage, "{bucket name}" refers to the principal address of the bundle, and "{directory of artifact}" refers to the subordinate address of the artifact. In at least some embodiments, the extracting includes maintaining an artifact hierarchy of the bundle in the object storage. In at least some embodiments, the registering section causes the object storage to extract the artifacts from the bundle. In at least some embodiments, the registering section extracts the artifacts from the bundle, and then transfers the artifacts to the object storage. In at least some embodiments, the bundle has a TAR or TAR.GZ extension.

At S240, the creating section or a sub-section thereof creates an artifact service specification for an artifact extracted from the bundle. As iterations of the creating at S240 proceed, the creating section creates one or more artifact service specifications, each artifact service specification representing one or more of the plurality of artifacts, each service specification representing the corresponding subordinate address, an artifact identifier, and an artifact type of each represented artifact. In at least some embodiments, the creating section identifies the artifact type based on a predetermined mapper function. In at least some embodiments in which the artifact hierarchy of the bundle is maintained in the object storage, the creating section identifies the artifact type based on the artifact hierarchy of the bundle. In at least some embodiments, the creating section links the artifact service specification to the bundle service specification using a "servicespecRelationship" field that indicates the bundle service specification. In at least some embodiments, the artifact service specification creation proceeds as shown in FIG. 3, which will be explained hereinafter.

At S236, the registering section or a sub-section thereof determines whether all of the artifacts extracted from the bundle have been processed for artifact service specification creation. If the registering section determines that unprocessed artifacts remain, then the operational flow proceeds to S238, where the next artifact is selected for processing before returning to artifact service specification creation at S240. If the registering section determines that artifacts have been processed, then the operational flow ends.

Figure 3:
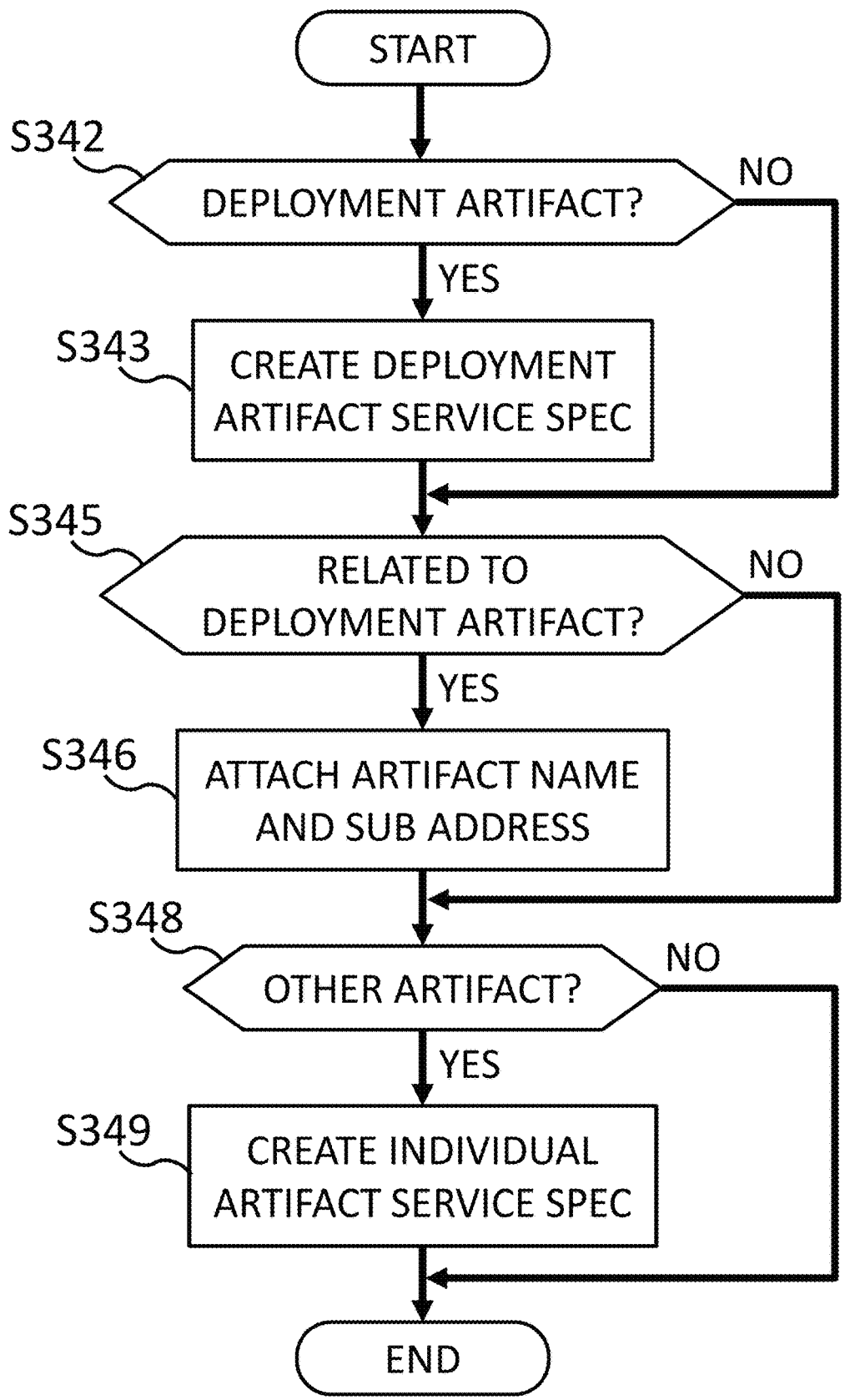
FIG. 3 is an operational flow for creating artifact service specifications, according to at least some embodiments of the present invention.

FIG. 3 is an operational flow for creating artifact service specifications, according to at least one embodiment of the present invention. The operational flow provides a method of creating artifact service specifications, such as the operation at S240 in FIG. 2. In at least some embodiments, the method is performed by a creating section of an apparatus, such as the creating section shown in FIG. 6, which will be explained hereinafter.

At S342, the creating section or a sub-section thereof determines whether an artifact is a deployment artifact. In at least some embodiments, a deployment artifact is an artifact that includes instructions for deployment of an application, such as a robin bundle or a helm chart. If the creating section determines that the artifact is a deployment artifact, then the operational flow proceeds to deployment artifact service specification creation at S343. If the creating section determines that the artifact is not a deployment artifact, then the operational flow proceeds to S345 without creating a deployment artifact service specification.

At S343, the creating section or a sub-section thereof creates a deployment artifact service specification for the artifact. In at least some embodiments, as iterations of the operational flow proceed, the creating section creates a deployment artifact service specification for each deployment artifact among the plurality of artifacts. In at least some embodiments, the creating section creates a related party attachment and a service specification characteristic attachment, and attaches the related party attachment and the service specification characteristic attachment to the deployment artifact service specification. In at least some embodiments, the creating section populates the deployment artifact service specification with fields of "id", "name", "version", "lifecycleStatus", "type", "baseType", etc. In at least some embodiments, the creating section copies the "relatedParty" attachment and the "ServiceSpecCharacteristic" attachment to the deployment artifact service specification. In at least some embodiments, the creating section creates an attachment to the deployment artifact service specification with fields of "id", "name", "url", "baseType", "type", "referredType", etc.

At S345, the creating section or a sub-section thereof determines whether an artifact is related to a deployment artifact. In at least some embodiments, an artifact related to a deployment artifact is an artifact that includes an application itself or executable code for compiling an application. If the creating section determines that the artifact is related to a deployment artifact, then the operational flow proceeds to attachment creation at S346. If the creating section determines that the artifact is not related to a deployment artifact, then the operational flow proceeds to S348 without creating an attachment.

At S346, the creating section or a sub-section thereof attaches the artifact name and subordinate address to a deployment artifact service specification of the related deployment artifact. In at least some embodiments, as iterations of the operational flow proceed, the creating section attaches, to the deployment artifact service specification, an artifact name and subordinate address of at least one related artifact among the plurality of artifacts. In at least some embodiments, the creating section populates the attachment to the deployment artifact service specification with fields of "id", "name", "url", "baseType", "type", "referredType", etc.

At S348, the creating section or a sub-section thereof determines whether an artifact is an artifact other than a deployment artifact or an artifact related to a deployment artifact. If the creating section determines that the artifact is an artifact other than a deployment artifact or an artifact related to a deployment artifact, then the operational flow proceeds to individual artifact service specification creation at S349. In at least some embodiments, as iterations of the operational flow proceed, remaining artifacts among the plurality of artifacts are represented by individual artifact service specifications among the one or more artifact service specifications. If the creating section determines that the artifact is not an artifact other than a deployment artifact or an artifact related to a deployment artifact, then the operational flow ends without creating an individual artifact service specification.

At S349, the creating section or a sub-section thereof creates an individual artifact service specification for the artifact. In at least some embodiments, the creating section creates an individual artifact service specification similar to a deployment artifact service specification, but without as many attachments. In at least some embodiments, the creating section populates the individual artifact service specification with fields of "id", "name", "version", "lifecycleStatus", "type", "baseType", etc. In at least some embodiments, the creating section creates an attachment to the individual artifact service specification with fields of "id", "name", "url", "baseType", "type", "referredType", etc.

Figure 4:
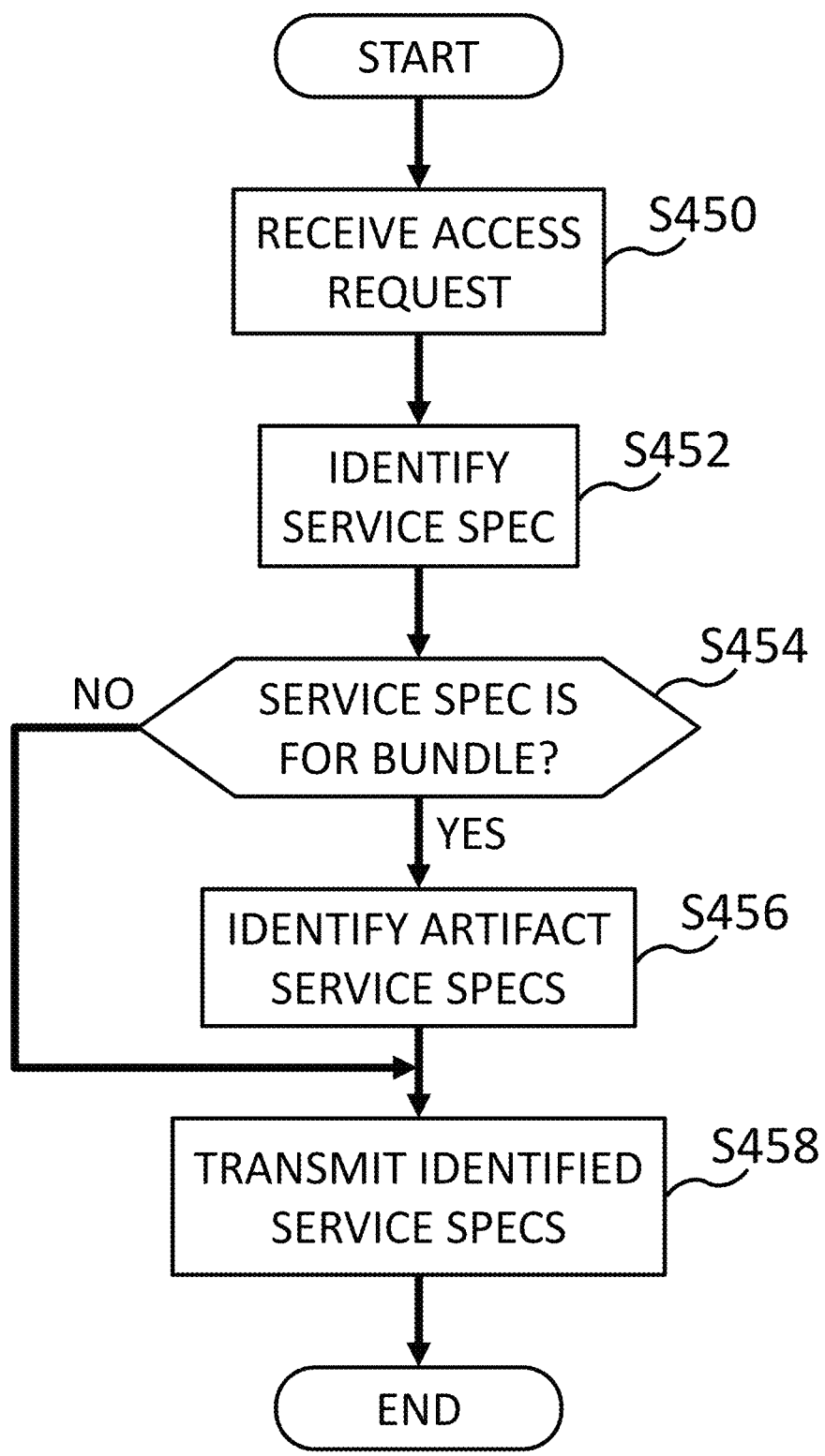
FIG. 4 is an operational flow for processing an access request, according to at least some embodiments of the present invention.

FIG. 4 is an operational flow for processing an access request, according to at least one embodiment of the present invention. The operational flow provides a method of processing an access request. In at least some embodiments, the method is performed by an accessing section of an apparatus, such as the accessing section shown in FIG. 6, which will be explained hereinafter.

At S450, the accessing section or a sub-section thereof receives a request for access to a service specification. In at least some embodiments, the accessing section receives the access request from a service module through an API, such as the TMF 633 API standard. In at least some embodiments, the accessing section receives an access request from a service module, the access request including a service specification identifier. In at least some embodiments, the access request includes an identifier of the service specification. In at least some embodiments, the access request is part of a request to deploy a cloud-based service provided by one or more applications of a bundle.

At S452, the accessing section or a sub-section thereof identifies the service specification. In at least some embodiments, the accessing section identifies a service specification from a database of service specifications by using the identifier in the access request.

At S454, the accessing section or a sub-section thereof determines whether the service specification identified at S452 is for a bundle. In at least some embodiments, the accessing section determines whether the service specification identifier corresponds to a bundle service specification. In at least some embodiments, the accessing section reads the service specification to determine whether a "type" field includes an indication that the service specification is for a bundle. If the accessing section determines that the service specification is for a bundle, then the operational flow proceeds to artifact service specification identification at S456. If the accessing section determines that the service specification is not for a bundle, then the operational flow proceeds to service specification transmission at S458.

At S456, the accessing section or a sub-section thereof identifies artifact service specifications of artifacts extracted from the bundle of the bundle service specification. In at least some embodiments, the accessing section identifies one or more artifact service specifications from the database of service specifications by reading each service specification to determine whether a "name" field includes an indication matching at least one of a "name" field and an "identifier" field of the bundle service specification.

At S458, the accessing section transmits the service specifications identified at S452 and S456 to the service module. In at least some embodiments, the accessing section transmits, to the service module, the service specification corresponding to the service specification identifier. In at least some embodiments, the accessing section transmits, to the service module in response to determining that the service specification identifier corresponds to a bundle service specification, one or more artifact service specifications representing artifacts extracted from a bundle represented by the bundle service specification. In at least some embodiments, each service specification transmitted to the service module includes a principal address to the corresponding bundle or a subordinate address to the corresponding artifact, which enables the service module to access the bundle or artifact directly. In at least some embodiments, the accessing section transmits artifact service specifications to service modules other than the requesting service module along with along with instructions or commands corresponding to the respective service module and artifact service specification. In at least some embodiments in which the access request is part of a request from a service order module to deploy a cloud-based service provided by one or more applications in the bundle of the bundle service specification, the accessing section transmits artifact service specifications to corresponding service modules along with instructions or commands to deploy the cloud-based service according to a Day 0 configuration.

In at least some embodiments, the ability of service modules to access specific artifacts within a bundle stems from the extracting and separate service specification creating performed by the apparatus. In other words, without extracting and creating separate service specifications for the artifacts within a bundle, service modules would retrieve entire bundles and parse the bundle for the artifact of interest before proceeding with the task. In at least some embodiments, the extracting and separate service specification creating lead to reduced use of computational and network resources in accessing artifacts of interest. In at least some embodiments, the extraction process is performed only once, and only artifacts of interest are transmitted across the network. In at least some embodiments, the computational resources required to create the artifact service specifications are outweighed by the reduction in computational resources required for multiple extraction operations performed by individual service modules.

FIG. 5 is a further operational flow for receiving a bundle service specification, according to at least one embodiment of the present invention. The operational flow provides a method of receiving a bundle service specification, such as the operation at S220 in FIG. 2. In at least some embodiments, the method is performed by a registering section of an apparatus, such as the registering section shown in FIG. 6, which will be explained hereinafter.

At S522, the registering section or a sub-section thereof determines whether the bundle service specification has a unique identifier. In at least some embodiments, the registering section determines whether an "identifier" field in the bundle service specification is identical to an existing service specification in a service specification database. If the registering section determines that the bundle service specification has a unique identifier, then the operational flow proceeds to S524. If the registering section determines that the bundle service specification does not have a unique identifier, then the operational flow proceeds to S529, at which the bundle service specification is rejected. In at least some embodiments, if the registering section determines that the bundle service specification does not have a unique identifier, then the registering section generates a new identifier, such as an identifier in the Universally Unique Identifier Version 4 (UUID4) format.

At S524, the registering section or a sub-section thereof determines whether the bundle service specification has a unique name and version. In at least some embodiments, the registering section determines whether a "name" field and a "version" field in the bundle service specification are both identical to a single existing service specification in the service specification database. If the registering section determines that the bundle service specification has a unique name and version, then the operational flow proceeds to S526. If the registering section determines that the bundle service specification does not have a unique name and version, then the operational flow proceeds to S529, at which the bundle service specification is rejected.

At S526, the registering section or a sub-section thereof determines whether the bundle service specification has valid relationship details. In at least some embodiments, the registering section determines whether a "name" field and a "role" field in a relationship attachment of the bundle service specification are pre-registered in the service specification database. In at least some embodiments, the bundle service specification includes a "relatedParty" attachment with fields of "id", "name", "role", "baseType", "type", etc. In at least some embodiments, the registering section determines whether a bidirectional relationship exists. If the registering section determines that the bundle service specification has valid relationship details, then the operational flow proceeds to timestamp recording at S528. If the registering section determines that the bundle service specification does not have valid relationship details, then the operational flow proceeds to S529, at which the bundle service specification is rejected.

At S528, the registering section or a sub-section thereof records a timestamp on the bundle service specification. In at least some embodiments, the registering section records the timestamp in a "createdOn" field of the bundle service specification. In at least some embodiments, the registering section adds the bundle service specification to the service specification database. In at least some embodiments, the registering section makes further verifications of the information in the bundle service specification before proceeding to S528.

At S529, the registering section or a sub-section thereof rejects the bundle service specification. In at least some embodiments, the registering section transmits a message to a service builder requesting registration of the bundle corresponding to the bundle service specification indicating that the bundle service specification is rejected, and providing a reason for rejection.

Figure 6:
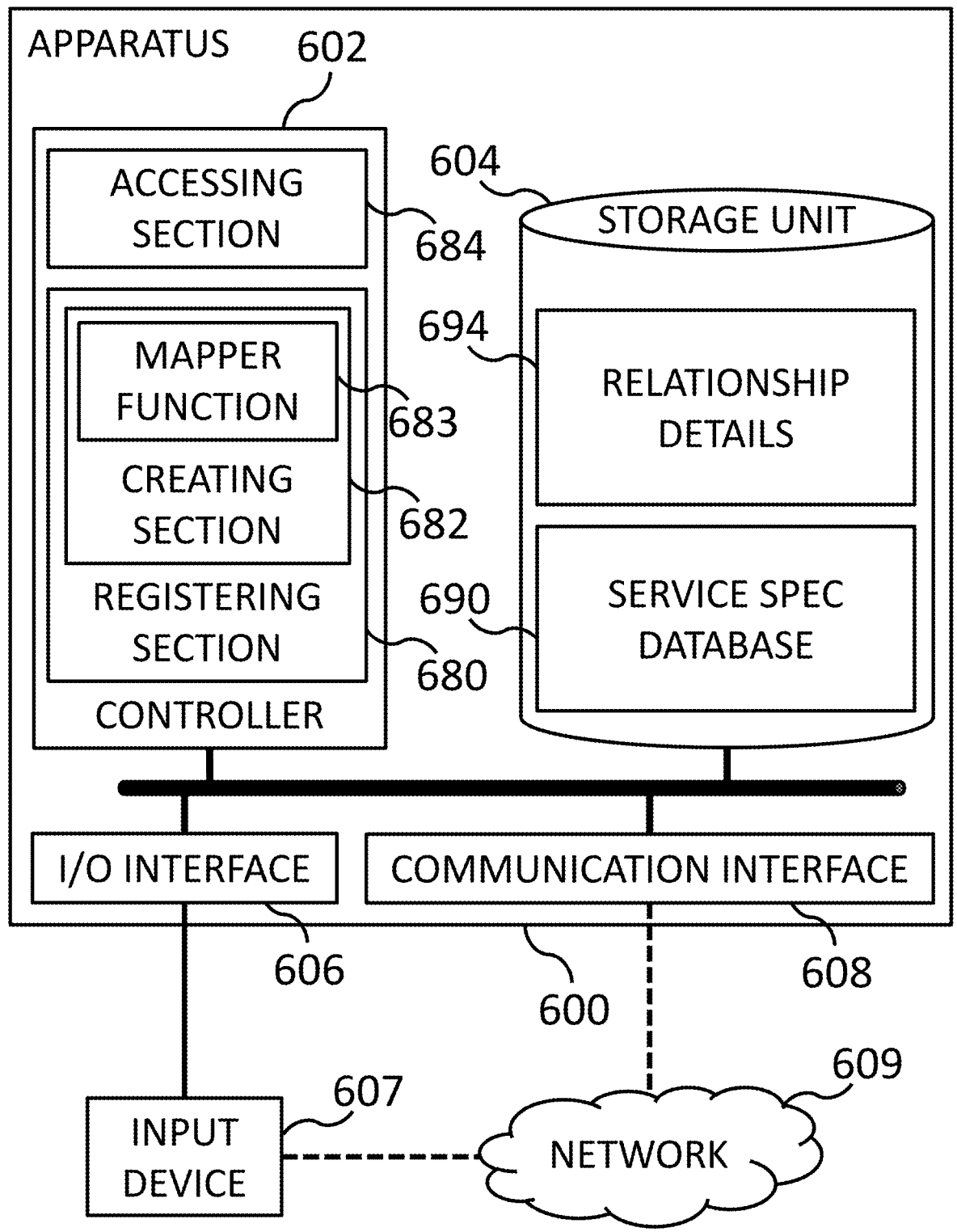
FIG. 6 is a block diagram of an exemplary hardware configuration for application artifact registration, according to at least some embodiments of the present invention.

FIG. 6 is a block diagram of an exemplary hardware configuration for application artifact registration, according to at least one embodiment of the present invention.

The exemplary hardware configuration includes apparatus 600, which communicates with network 609, and interacts with input device 607. In at least some embodiments, apparatus 600 is a computer or other computing device that receives input or commands from input device 607. In at least some embodiments, apparatus 600 is a host server that connects directly to input device 607, or indirectly through network 609. In at least some embodiments, apparatus 600 is a computer system that includes two or more computers. In at least some embodiments, apparatus 600 is a personal computer that executes an application for a user of apparatus 600.

Apparatus 600 includes a controller 602, a storage unit 604, a communication interface 608, and an input/output interface 606. In at least some embodiments, controller 602 includes a processor or programmable circuitry executing instructions to cause the processor or programmable circuitry to perform operations according to the instructions. In at least some embodiments, controller 602 includes analog or digital programmable circuitry, or any combination thereof. In at least some embodiments, controller 602 includes physically separated storage or circuitry that interacts through communication. In at least some embodiments, storage unit 604 includes a non-volatile computer-readable medium capable of storing executable and non-executable data for access by controller 602 during execution of the instructions. Communication interface 608 transmits and receives data from network 609. Input/output interface 606 connects to various input and output units, such as input device 607, via a parallel port, a serial port, a keyboard port, a mouse port, a monitor port, and the like to accept commands and present information.

Controller 602 includes registering section 680, creating section 682, which includes mapper function 683, and accessing section 684. Storage unit 604 includes service specification database 690, relationship details 694, and tracking details 796.

Registering section 680 is the circuitry or instructions of controller 602 configured to receive bundle service specifications. In at least some embodiments, registering section 680 is configured to receive a bundle service specification configured for deployment of a software service in a cloud native environment as part of a request for registration of the bundle in a software service catalog. In at least some embodiments, registering section 680 records information to storage unit 604, such as in service specification database 690, and utilize information in storage unit 604, such as in relationship details 694. In at least some embodiments, registering section 680 includes sub-sections for performing additional functions, as described in the foregoing flow charts. In at least some embodiments, such sub-sections may be referred to by a name associated with their function.

Creating section 682 is the circuitry or instructions of controller 602 configured to create service specifications. In at least some embodiments, creating section 682 is configured to create artifact service specifications for artifacts extracted from bundles, and to create attachments for bundle service specifications and deployment artifact service specifications. In at least some embodiments, creating section 682 utilizes mapper function 683 as well as information in storage unit 604, such as service specification database 690. In at least some embodiments, creating section 682 includes sub-sections for performing additional functions, as described in the foregoing flow charts. In at least some embodiments, such sub-sections may be referred to by a name associated with their function.

Accessing section 684 is the circuitry or instructions of controller 602 configured to respond to access requests from service modules. In at least some embodiments, accessing section 684 is configured to receive requests for access to service specifications, and to transmit service specifications to the requesting service module. In at least some embodiments, accessing section 684 retrieves information from storage unit 604, such as in service specification database 690. In at least some embodiments, accessing section 684 includes sub-sections for performing additional functions, as described in the foregoing flow charts. In at least some embodiments, such sub-sections may be referred to by a name associated with their function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

Various embodiments of the present invention are described with reference to flowcharts and block diagrams whose blocks may represent (1) steps of processes in which operations are performed or (2) sections of a controller responsible for performing operations. Certain steps and sections are implemented by dedicated circuitry, programmable circuitry supplied with computer-readable instructions stored on computer-readable media, and/or processors supplied with computer-readable instructions stored on computer-readable media. In some embodiments, dedicated circuitry includes digital and/or analog hardware circuits and may include integrated circuits (IC) and/or discrete circuits. In some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Various embodiments of the present invention include a system, a method, and/or a computer program product. In some embodiments, the computer program product includes a computer readable storage medium (or media) having computer readable program instructions thereon for causing a processor to carry out aspects of the present invention.

In some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, computer readable program instructions described herein are downloadable to respective computing/processing devices from a computer readable storage medium or to an external computer or external storage device via a network, for example, the Internet, a local area network, a wide area network and/or a wireless network. In some embodiments, the network may includes copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, the computer readable program instructions are executed entirely on the user's computer, partly on the user's computer, as a stand-alone software package, partly on the user's computer and partly on a remote computer or entirely on the remote computer or server. In some embodiments, in the latter scenario, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present invention.

While embodiments of the present invention have been described, the technical scope of any subject matter claimed is not limited to the above described embodiments. It will be apparent to persons skilled in the art that various alterations and improvements can be added to the above-described embodiments. It will also be apparent from the scope of the claims that the embodiments added with such alterations or improvements are included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the processes must be performed in this order.

According to at least one embodiment of the present invention, application artifact registration is performed by receiving a bundle service specification configured for deployment of a software service in a cloud native environment, transferring a bundle from an original address indicated in the bundle service specification to an object storage at a principal address, attaching, to the bundle service specification, a bundle identifier and the principal address, extracting a plurality of artifacts from the bundle, each of the plurality of artifacts being stored in the object storage at a subordinate address, and creating one or more artifact service specifications, each artifact service specification representing one or more of the plurality of artifacts, each service specification representing the corresponding subordinate address, an artifact identifier, and an artifact type of each represented artifact.

Some embodiments include the instructions in a computer program, the method performed by the processor executing the instructions of the computer program, and an apparatus that performs the method. In some embodiments, the apparatus includes a controller including circuitry configured to perform the operations in the instructions.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory computer-readable storage medium including instructions executable by a computer to cause the computer to perform operations comprising:
    receiving a bundle service specification configured for deployment of a software service in a cloud native environment;
    transferring a bundle from an original address indicated in the bundle service specification to an object storage at a principal address;
    attaching, to the bundle service specification, a bundle identifier and the principal address;
    extracting a plurality of artifacts from the bundle, each of the plurality of artifacts being stored in the object storage at a subordinate address;
    creating one or more artifact service specifications, each artifact service specification representing one or more of the plurality of artifacts, each service specification representing the corresponding subordinate address, an artifact identifier, and an artifact type of each represented artifact.

2. The non-transitory computer-readable storage medium of claim 1, wherein the creating the one or more artifact service specifications includes
    creating a deployment artifact service specification for each deployment artifact among the plurality of artifacts; and
    attaching, to the deployment artifact service specification, an artifact name and subordinate address of at least one related artifact among the plurality of artifacts;

wherein remaining artifacts among the plurality of artifacts are represented by individual artifact service specifications among the one or more artifact service specifications.

3. The non-transitory computer-readable storage medium of claim 1, wherein the operations further comprise identifying the artifact type based on a predetermined mapper function.

4. The non-transitory computer-readable storage medium of claim 1, wherein the operations further comprise:
receiving an access request from a service module, the access request including a service specification identifier; and
transmitting, to the service module, the service specification corresponding to the service specification identifier.

5. The non-transitory computer-readable storage medium of claim 4, wherein the operations further comprise:
determining whether the service specification identifier corresponds to a bundle service specification; and
transmitting, to the service module in response to determining that the service specification identifier corresponds to a bundle service specification, one or more artifact service specifications representing artifacts extracted from a bundle represented by the bundle service specification.

6. The non-transitory computer-readable storage medium of claim 1, wherein the extracting includes maintaining a artifact hierarchy of the bundle in the object storage.

7. The non-transitory computer-readable storage medium of claim 6, wherein the operations further comprise identifying the artifact type based on the artifact hierarchy of the bundle.

8. The non-transitory computer-readable storage medium of claim 1, wherein the receiving the bundle includes receiving a request for registration of the bundle in a software service catalog through an Application Programming Interface.

9. A method comprising:
receiving a bundle service specification configured for deployment of a software service in a cloud native environment;
transferring a bundle from an original address indicated in the bundle service specification to an object storage at a principal address;
attaching, to the bundle service specification, a bundle identifier and the principal address;
extracting a plurality of artifacts from the bundle, each of the plurality of artifacts being stored in the object storage at a subordinate address;
creating one or more artifact service specifications, each artifact service specification representing one or more of the plurality of artifacts, each service specification representing the corresponding subordinate address, an artifact identifier, and an artifact type of each represented artifact.

10. The method of claim 9, wherein the creating the one or more artifact service specifications includes
creating a deployment artifact service specification for each deployment artifact among the plurality of artifacts; and
attaching, to the deployment artifact service specification, an artifact name and subordinate address of at least one related artifact among the plurality of artifacts;
wherein remaining artifacts among the plurality of artifacts are represented by individual artifact service specifications among the one or more artifact service specifications.

11. The method of claim 9, further comprising identifying the artifact type based on a predetermined mapper function.

12. The method of claim 9, further comprising:
receiving an access request from a service module, the access request including a service specification identifier; and
transmitting, to the service module, the service specification corresponding to the service specification identifier.

13. The method of claim 12, further comprising:
determining whether the service specification identifier corresponds to a bundle service specification; and
transmitting, to the service module in response to determining that the service specification identifier corresponds to a bundle service specification, one or more artifact service specifications representing artifacts extracted from a bundle represented by the bundle service specification.

14. The method of claim 9, wherein the extracting includes maintaining a artifact hierarchy of the bundle in the object storage.

15. The method of claim 14, further comprising identifying the artifact type based on the artifact hierarchy of the bundle.

16. The method of claim 9, wherein the receiving the bundle includes receiving a request for registration of the bundle in a software service catalog through an Application Programming Interface.

17. An apparatus comprising:
a controller including circuitry configured to
receive a bundle service specification configured for deployment of a software service in a cloud native environment;
transfer a bundle from an original address indicated in the bundle service specification to an object storage at a principal address;
attach, to the bundle service specification, a bundle identifier and the principal address;
extract a plurality of artifacts from the bundle, each of the plurality of artifacts being stored in the object storage at a subordinate address;
create one or more artifact service specifications, each artifact service specification representing one or more of the plurality of artifacts, each service specification representing the corresponding subordinate address, an artifact identifier, and an artifact type of each represented artifact.

18. The apparatus of claim 17, wherein the creating the one or more artifact service specifications includes
creating a deployment artifact service specification for each deployment artifact among the plurality of artifacts; and
attaching, to the deployment artifact service specification, an artifact name and subordinate address of at least one related artifact among the plurality of artifacts;
wherein remaining artifacts among the plurality of artifacts are represented by individual artifact service specifications among the one or more artifact service specifications.

19. The apparatus of claim 17, wherein the controller is further configured to identify the artifact type based on a predetermined mapper function.

20. The apparatus of claim 17, wherein the controller is further configured to:
   receive an access request from a service module, the access request including a service specification identifier; and
   transmit, to the service module, the service specification corresponding to the service specification identifier.

* * * * *